(12) United States Patent
Neckel

(10) Patent No.: US 7,513,216 B2
(45) Date of Patent: Apr. 7, 2009

(54) SMART BOWL SYSTEM

(75) Inventor: Eric Alexus Neckel, Bellvue, CO (US)

(73) Assignee: Smart Pet Products, LLC, Bellvue, CO (US)

( * ) Notice: Subject to any disclaimer, the term of this patent is extended or adjusted under 35 U.S.C. 154(b) by 269 days.

(21) Appl. No.: 11/650,684

(22) Filed: Jan. 8, 2007

(65) Prior Publication Data

US 2007/0144446 A1    Jun. 28, 2007

Related U.S. Application Data

(63) Continuation-in-part of application No. 11/061,281, filed on Feb. 18, 2005, now Pat. No. 7,159,539.

(51) Int. Cl.
*A01K 1/10* (2006.01)
(52) U.S. Cl. .................. 119/51.02; 119/51.01
(58) Field of Classification Search ............. 119/51.01, 119/51.02, 74, 51.11, 78, 57.1, 61.5
See application file for complete search history.

(56) References Cited

U.S. PATENT DOCUMENTS

| 5,174,244 | A | | 12/1992 | Gaalswyk |
| 5,299,529 | A | * | 4/1994 | Ramirez ................... 119/51.11 |
| 6,062,166 | A | * | 5/2000 | Macrina ................... 119/51.11 |
| 6,318,291 | B1 | * | 11/2001 | Wolanski ................... 119/61.5 |
| 6,401,657 | B1 | * | 6/2002 | Krishnamurthy .......... 119/51.11 |
| 6,722,318 | B2 | * | 4/2004 | Hotmer ....................... 119/712 |
| 7,295,889 | B2 | * | 11/2007 | Lahteenmaki ................ 700/233 |
| 7,426,901 | B2 | * | 9/2008 | Turner et al. .............. 119/51.02 |
| 2002/0007798 | A1 | | 1/2002 | Pavlak et al. |
| 2005/0193954 | A1 | | 9/2005 | Cureton et al. |

* cited by examiner

*Primary Examiner*—Yvonne R. Abbott
(74) *Attorney, Agent, or Firm*—Craig Miles; CR Miles, P.C.

(57) ABSTRACT

An animal feeder which generates sensorially perceivable indicia upon the coincidence an alteration in food or water conditions and the proximity of a person to the animal feeder.

21 Claims, 3 Drawing Sheets

US 7,513,216 B2

SMART BOWL SYSTEM

Figure 1:
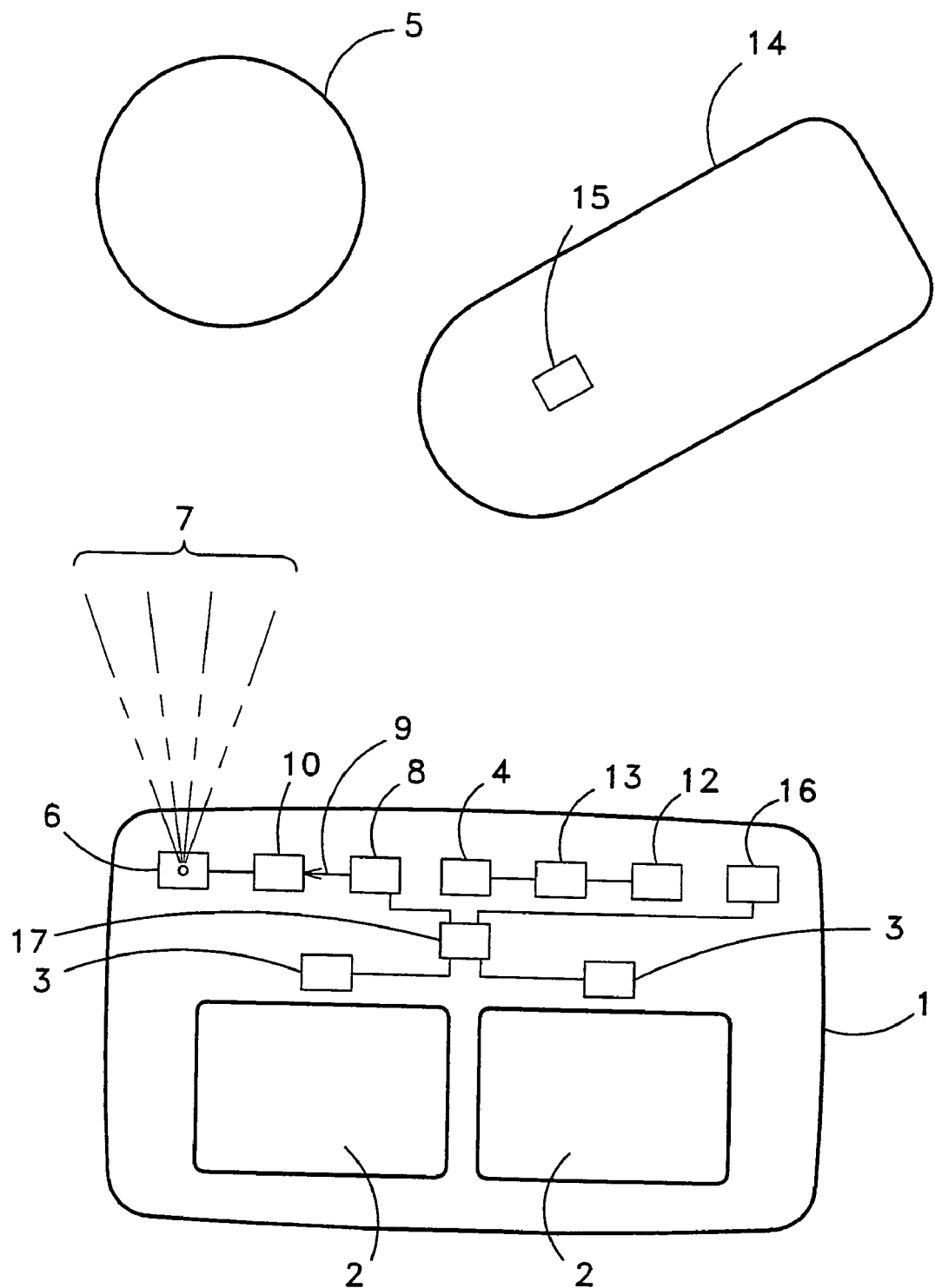

This United States Patent Application is a continuation-in-part of U.S. patent application Ser. No. 11/061,281, filed Feb. 18, 2005, now issued as U.S. Pat. No. 7,159,539, hereby incorporated by reference herein.

I. BACKGROUND

The invention relates to an animal feeder which in response to the coincidence of at least one altered feed condition of the feed contained by the animal feeder and the proximity of a person to the animal feeder generates a sensorially perceivable indicia.

A numerous and wide variety of animal feeders have been developed which in basic configurations simply retain animal food or water for consumption by an animal. These basic configurations have been modified to further include water supply means and temperature control means to maintain fresh water at a controlled temperature as disclosed for example by U.S. Pat. Nos. 5,138,980; 3,306,236; 2,612,138; 1,553,739; and 1,497,202. Other animal feeders provide a sensor which detects that the feeder requires filling to actuate a re-fill indicator, as disclosed for example by U.S. Pat. No. 6,318,291. Certain animal feeders are further mechanized to automatically dispense measured amounts of food and water at timed intervals as disclosed for example by U.S. Pat. Nos. 5,735,231; 5,138,979; and 1,309,090. Interaction between the animal and the animal feeder has been exploited in order to dispense animal food as disclosed for example by U.S. Pat. Nos. 6,053,124; 5,113,795; 4,799,455. For those animals that react poorly to being fed by a machine, certain animal feeders further provide prerecorded audio or video presentations to create a familiar atmosphere during feeding as disclosed for example by U.S. Pat. No. 5,299,529.

Even though there is a large commercial market for animal feeders and a numerous and wide variety of animal feeders are available for that commercial market, there remains a significant unresolved problem in that animal feeders may not sense the coincidence of an altered food condition or characteristic and the proximity of a person to the animal feeder as a trigger for the generation of a sensorially perceivable indicia to attract the person to the animal feeder. As can be understood from the discussion above, a great majority of animal feeders have no manner of sensing food characteristics, such as the amount of food or water in the animal feeder, the level of the food or water in the animal feeder, or the duration of time which has elapsed since the food was placed in animal feeder. Automating dispensation of food and water as described by the various references disclosed has not focused upon involving a person in the animal feeding process, but rather teaches away from involving a person by reducing or completely alleviating the recurring task of feeding and watering of animals by a person. In the few instances, where the animal feeder does afford an indicia of the amount of food or water in the animal feeder the indicia means remains responsive to the condition of the feeder or the contents of the feeder, but not the environment, animals, or persons proximate to the animal feeder.

By contrast the instant animal feeder invention, affords sensorially perceivable indicia to a person which are coincidence with alternation of the food or water conditions and the proximity of the person to the animal feeder.

II. SUMMARY OF THE INVENTION

Accordingly, a broad object of the invention can be to provide an animal feeder which generates at least one sensorially perceivable indicia upon the coincidence of alteration of at least one feed characteristic or condition and the proximity of a person to the animal feeder.

Another, broad object of the invention can be to provide an animal feeder which generates at least one sensorially perceivable indicia upon the coincidence of alteration of at least one feed characteristic or condition and the proximity of an animal to the animal feeder.

Another, broad object of the invention can be to provide an animal feeder which generates at least one sensorially perceivable indicia upon the coincidence of alteration of at least one feed characteristic or condition and the proximity of an animal and a person to the animal feeder.

Naturally, further objects of the invention are disclosed throughout other areas of the specification, drawings, photographs, and claims.

III. A BRIEF DESCRIPTION OF THE DRAWINGS

FIG. 1 provides a block diagram of a generic embodiment of the animal feeder invention.

Figure 2:
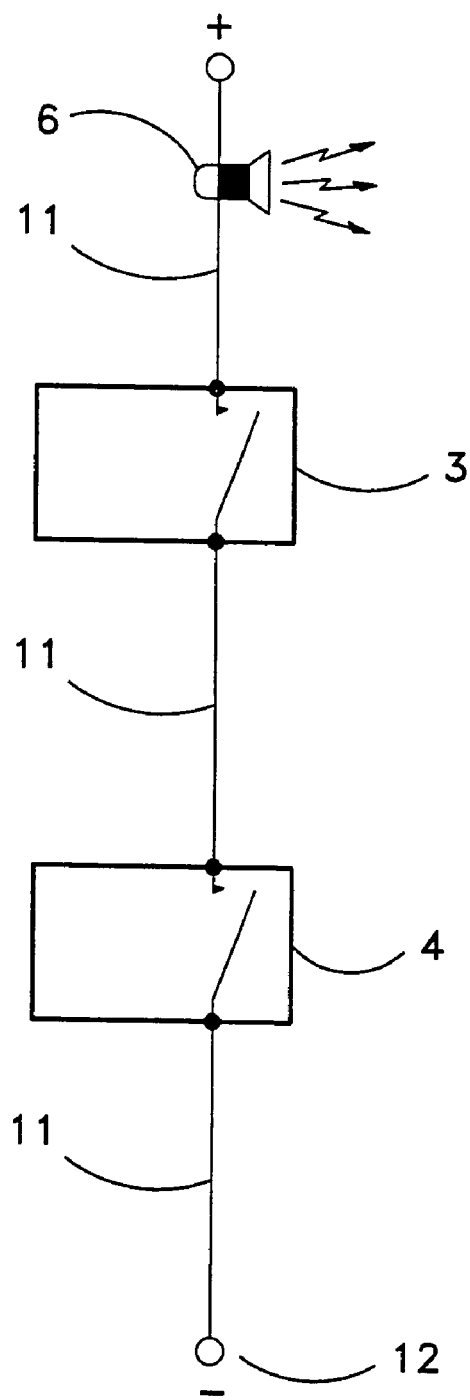

FIG. 2 provides a first illustrative schematic diagram of a logic circuit that can be used with a particular embodiment of the invention.

Figure 3:
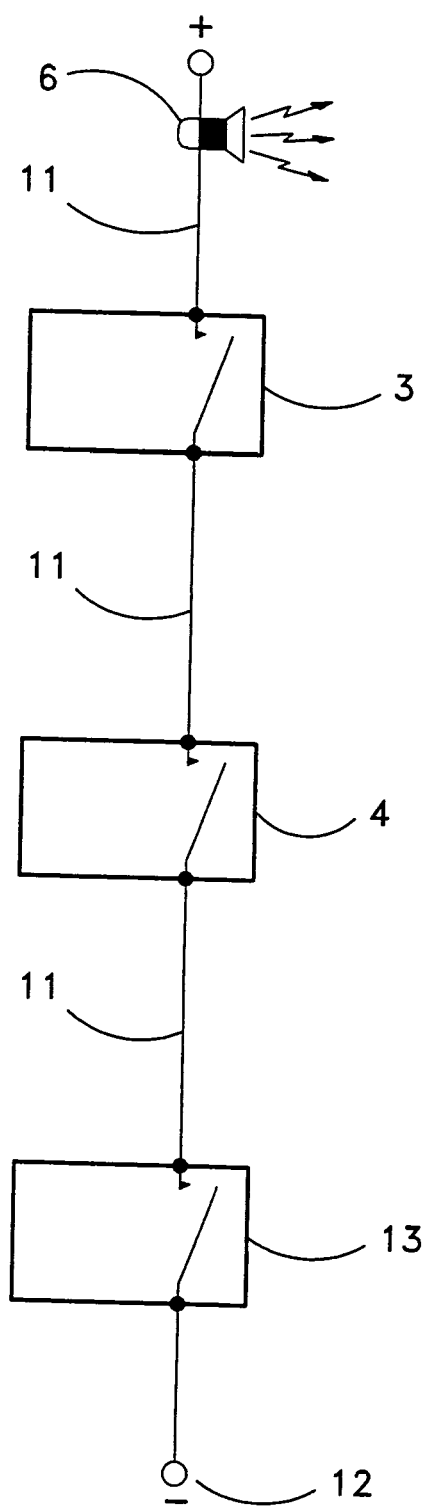

FIG. 3 provides a second illustrative schematic diagram of a logic circuit that can be used with a particular embodiment of the invention.

IV. DETAILED DESCRIPTION OF THE PREFERRED EMBODIMENTS

An animal feeder which provides sensorially perceivable indicia to a person upon the coincidence of an altered feed condition and the proximity of a person to the animal feeder.

Now referring primarily to FIG. 1, an animal feeder invention which can include a feeder (1) in which an amount of feed (2) can be established. The term "feeder" in accordance with the invention refers to any receptacle in which "feed" as described below can be established to feed an animal. The term "feeder" is not intended to be limited to any particular physical configuration and without limitation includes the numerous and wide variety of dishes, platters, plates, bowls, dispensers, crocks, bottles, fountains, dispensers, or the like whether or not partially or entirely automated to dispense food or water regardless of the manner of or material of construction.

The term "feed" in accordance with the invention means any manner of material which can be established in the "feeder" for consumption by an animal, including without limitation dry animal food, biscuits, canned animal food, prescription animal diets, diets containing medicaments, medicaments, seeds, meals, pellets, flakes, frozen food, water, or the like. The term is not intended to be limited to any particular type or kind of animal feed and the term is intended to generically include individually or in various combinations solid or liquid materials which can be feed with a feeder to any of numerous species or breeds of animals including without limitation dogs, cats, fish, birds, poultry, horses, cows, sheep, goats, hawks, pigs, quail, zoo animals, farm animals, rabbits, hamsters, mice, ferrets, reptiles, or the like.

A first sensor (3) can be made responsive to at least one altered feed condition or altered feed characteristic of the feed (2) in the feeder (1) or to which the first sensor (3) is responsive. The term "altered feed condition" in accordance with the invention means any alteration of a feed characteristic or alteration of a feed condition which can be sensed by the first sensor (3) and without limitation includes an elapse of a duration of time that the feed (2) has resided in the feeder; the alteration of the amount of feed (2) contained in the feeder (1); an alteration in the level of feed (2) in the feeder (1); an alteration of the amount of weight of an amount of feed (2) contained by the feeder (1); an alteration of an amount of force generated by all or a portion of the amount of feed (2) contained by the feeder, an alteration in the reflectivity (whether to light, sound, radiation, or otherwise) at a location within the feeder (1) due to an alteration in the condition of the feed (2); an alteration in temperature of the feed (2) established in the feeder (1), or the like. The term "altered feed condition" can further include any condition which affects the feeder (1) independent of the feed (2) or to act upon the feed (1) established within the feeder including without limitation alteration in position of the feeder (1), inclination of the feeder (1), angle of the feeder (1), location of the feeder (1), the amount of light incident upon the feeder (1), the amount of sound incident upon the feeder (1), or the like.

The first sensor (3) can comprise any manner of sensor which can sense an altered feed condition. As to certain embodiments of the invention the first sensor (3) can for example comprise a fluid level sensor operable in response to the level of a liquid in the feeder (1). A numerous and wide variety of fluid level sensors can be made responsive to the level of liquid in the feeder (1) and are encompassed by the invention, including without limitation, a float level switch such as disclosed by Crydom Magnetics Ltd, RSF14; a differential pressure sensor; magnetic float sensor; or the like, which operate to deactuate or actuate an electromechanical switch such as a reed switch, relay, solid state switch, or the like. Alternately, the invention further encompasses fluid level sensors which utilize an electrical conductivity or resistivity liquid level switch using a low voltage power source applied across separate electrodes. Contacting both electrodes with the liquid in the feeder completes a conductive circuit. The fluid level sensors can also comprise an air bubbler liquid level switch which uses a constant volumetric rate of gas flow through a tube submerged in the liquid. The amount of pressure required to force the bubbles through the tube can be measured to ascertain liquid level or in certain applications the type of liquid in the feeder. Optical fluid sensors which utilize an infrared emitter and optical receiver such as provided by Gentech International, OS Series can also be utilized as the first sensor (3) in certain embodiments of the invention.

These examples of liquid level sensors encompassed by various embodiments of the invention are intended to be illustrative and not limiting with regard to the numerous and wide variety of liquid level sensors that can be utilized in accordance with the invention as the first sensor (3) and the examples are intended not to exclude other types of liquid level sensors which may emit radio waves, ultrasonic waves, radar waves, and measure the amount or frequency of the reflected wavelengths from the amount of feed (2).

As to other embodiments of the invention, the first sensor (3) can comprise a solids level switch operable in response to the level of feed (2) in the feeder (1). A wide variety of solids level switches can be made responsive to the level of the feed (2) in the feeder (1) including without limitation a solids level switch such as the K-TEK, SF 50 vibrating fork level switch.

Certain embodiments of the invention can include a first sensor (3) which measures the pressure of the feed (2) in the feeder (1). For example, a membrane switch having a static layer which does not flex and a flexible membrane layer which flexes in response to an amount of feed (2). The static layer carries one pole, both poles, or can be used to short both poles of a switch together. The membrane switch can include further layers such as graphic layers, tactile layers and rigid layers. Alternately, a thin-film pressure sensor can be applied to a surface of the feeder (1) to sense the amount of feed (2) in the feeder (1), for example as disclosed by Hobby Engineering, item number 30056.

Yet other embodiments of the invention can include various types of infrared sensors, ultrasonic sensors, radiofrequency sensors which can generate a signal indicating whether or not a certain level of feed (2) or amount of feed (2) is contained by the feeder (1). Non-limiting examples encompassed by the invention, include infrared sensors which utilize an infrared emitting diode and an NPN silicon phototransistor mounted on the feeder (1). The phototransistor can respond to radiation emitted from the light emitting diode reflected back from the feed (2) in the animal feeder (1).

The first sensor (3) can be a timer which measures an amount of time the feed (2) has resided in the feeder (3), or in conjunction with any of the above-described sensors, or other sensors such as tilt sensors, temperature sensors, whisker sensors, or the like, utilized to sense alteration of a condition of the feed (2) or the feeder (1) which acts upon the feed.

As can be understood from the forgoing description, a numerous and wide variety of sensors can be used in accordance with the invention as a first sensor (3) to sense an altered feed condition or altered feed characteristic whether the alteration or condition of the feed (2) is inherent to the feed (2) itself or due to action upon the feed (2) by the alteration or condition of the feeder (1). The instant description of a first sensor (3) is intended to broadly encompasses all manner and variety of sensors capable of sensing an altered feed condition or altered feed characteristic whether utilized independently or in combination to sense or detect a single or a plurality of altered feed condition(s) at a point in time or over a duration in time.

Again referring primarily to FIG. 1, the second sensor (4) can comprise any manner of sensor which can sense the proximity of a person (5) to the feeder (1). As to certain embodiments of the invention, for example, the second sensor (4) can comprise an infrared or passive infrared sensor. A passive infrared sensor can be tuned to detect infrared radiation emitted from the person (5). Typically, a lens within the infrared sensor divides its coverage area into pie-shaped segments and positive detection of the person (5) occurs when the infrared sensor "sees" the motion of infrared radiation from a first pie-shaped segment to the next. A variety of suitable infrared sensors are available, and without limitation to the forgoing generic description of the second sensor (4), include for example the Sharp GP1U58X a 40 kHz modulated infrared light detector, the LiteOn LTM 97 AS-40 and the LiteOn LTM 97DS-40.

As to other embodiments of the invention the second sensor (4) can comprise an ultrasonic motion sensor. Ultrasonic transducers often utilize piezoelectric crystals which resonate to a desired frequency and convert electric energy into acoustic energy and vice versa. The sound waves are typically transmitted in the shape of a cone from the motiion sensor and are reflected from the person (5) back to a transducer. A variety of suitable ultrasonic motions sensors are available, and without limitation to the generic description of the second sensor (4), include for example the Migratron RPS-409A-IS and the PASCO, PASPORT Motion Sensor PS-2103.

Another non-limiting example of the second sensor (4) encompassed by the invention, includes infrared sensors which can utilize an infrared emitting diode and an NPN silicon phototransistor mounted on the feeder (1). The phototransistor can respond to radiation emitted from the light emitting diode reflected back from the person proximate to the feeder. Alternately, an integrated sensor with infrared emitter, detector, optics, and timing logic can be used which produces an analog voltage proportional to the distance to the nearest object found in its field of view. As an example a Sharp GP2Y0A02YK infrared sensor can detect objects within a range of about eight inches to about sixty inches.

As to other embodiments of the invention the second sensor (2) can comprise a load sensor responsive to all or a portion of the weight of the person (5) proximate to the animal feeder (1). A wide variety of load sensors are suitable for use with the invention including without limitation pressure switches which respond to part or all of the weight of the person (5). For example, a pressure sensor can be positioned between two mated surfaces or in a floor mat having a location in which the person (5) is to be detected. When the person travels over the mating surfaces the increase in pressure or load can be sensed. Without limitation to the generic description of pressure sensor above, as an example, various pressure mats suitable for use with the invention are manufactured by Arun Electronics Ltd, United Kingdom.

It is not intended, however, that the invention be limited to embodiments in which the second sensor (4) is responsive only to a person (5) proximate to the feeder (1) and as to certain embodiments of the invention the second sensor (4) can be responsive to a person (5) locatable a distance from the feeder (1). As to these embodiments of the invention the second sensor (4) can be responsive to a person (5) locatable by tracking a mobile or cellular telephone, a blackberry, or similar wireless device (collectively referred hereafter as "cellular telephones") by including directly or utilizing indirectly a cellular telephone tracking hardware, software or service, such as the software and service available from Accu-Tracking, Inc. Similarly, the second sensor (4) can be responsive to a person (5) locatable by a discoverable modem capable cellular telephone which can be pinged via bluetooth or the like. Again, the second sensor (4) can be responsive to a human locatable by a global position system tracking device or by or at an Internet or broadband domain address, or the like. As can be understood from the forgoing description, a numerous and wide variety of sensors can be used in accordance with the invention as a second sensor (4) to sense a person (5) proximate to the feeder (1) or locatable a distance from the feeder (1). The instant description of a second sensor (4) is intended to broadly encompasses all manner and variety of sensors capable of sensing a person (5) proximate to or locatable a distance from the feeder.

Now referring primarily to FIG. 1, the animal feeder can further include an indicia generator (6) which generates sensorially perceivable indicia (7) to the person proximate to the feeder (1). The term "sensorially perceivable indicia" is intended to include any manner of indication perceivable by the person (5) and the term "indicia generator" (6) can without limitation include any type or kind of emitter of light, sound, smell, or which provides tactile indicia, such as: light emitting diodes, incandescent lights, light emitting diodes or incandescent lights which flash or change color, piezoelectric sound generators, mechanical buzzers, magnetic buzzers, piezoelectric sirens, piezoelectric indicators, tone generators, speakers, digital messages, vibrotactile bars, pulsating transducers, actuatable aerosol dispensers, or a transmission such as telephone, facsimile, e-mail, wireless transmission, broadband, or the like.

The animal feeder invention further includes, a signal generator (8) responsive to the first sensor (3) and the second sensor (4) which generates a signal (9) in response to the coincidence of the first sensor (3) detecting or sensing an altered feed condition and the second sensor (4) detecting or sensing the person (5) proximate to the feeder (1). The signal generator (8) can, without limitation, be the coincident closure of poles of switches correspondingly responsive to the first sensor (3) and the second sensor (4) to close a circuit which provides power to the perceivable indicia generator (6). Alternately, the signal generator (8) can generate ultrasonic waves, infrared waves, or the like to a receiver (10) which triggers the perceivable indicia generator. Yet, as to other embodiments of the invention the signal generator (8) can be an analog or digital signal generator which transmits a signal (9) to trigger the perceivable indicia generator (6).

The animal feeder invention can further include a third sensor (13) which detects or senses an animal (14) in proximity to the feeder. The third sensor (14) can act independent of or in combination with the second sensor (4) to trigger the indicia generator (6). In the first instance, sensorially perceivable indicia (7) to the animal can provide an indication that the condition of the feed (2) in the feeder (1) has been altered which in certain embodiments of the invention can include the addition of feed (2) to the feeder (1). In other embodiments of the invention, the sensorially perceivable indicia (7) to the person (5) can indicate that the animal (14) is in proximity to the feeder (1) and there is an altered feed condition. Again, a wide variety of proximity sensors, as described above, can be used to detect or sense the proximity of the animal (14) to the feeder (1). A particular embodiment of the animal feeder invention includes a transmitter or transponder (15) coupled to the animal (14) (typically on the animal's collar) (see for example, Radio Systems Corporation, Knoxville, Tenn.), or an object carried or manipulated by the animal, or implanted in the animal, which transmits a signal to a signal receiver (16) (which can in some embodiments be coded to the particular animal by frequency or by geo-position location coordinate), which in accordance with the logic circuit established between the first sensor (3), the second sensor (4), and the third sensor (13) can trigger the indicia generator (6) to generate sensorially perceivable indicia (7).

Now referring to FIGS. 2 and 3, a wide variety of circuit means (11) including a power source (12) which generates a current whether alternating current, transformed alternating current, direct current produced with a battery or alternating current transformed to direct current, conductors, switches, or the like, can coordinate the first sensor reports relating to at least one feed condition or characteristic of the feed (2) with the second sensor reports relating to the proximity of the person (5) to the feeder (1) with the actuation of the perceivable indicia generator (6) to produce sensorially perceivable indicia (7) to notify the person (5) that the feeder (1) requires some action on the part of the person relative to at least one feed condition. FIG. 3 provides an illustrative logic circuit that can be used to coordinate the report from the third sensor (13) of an animal (14) in proximity to the feeder (1) to actuate perceivable indicia generator (6) to produce the sensorially perceivable indicia (7) to notify the person (5) that the feeder (1) requires some action on the part of the person relative to at least one feed condition.

The invention can as to certain embodiments of the invention include a programmable memory (17) coupled to said circuit means to provide programmable logic for operation of the first sensor(s)(3), the second sensor (4), and the third sensor (13) as well as generate a signal to the indicia generator (6). As to some embodiments of the invention the programmable memory (17) can further provide a digital message, a connection to broadband transmission or telephone transmission, or transmit information pertaining to an animal (14) having proximity to the feeder (1), including the transmission of images of the animal (14), as to those embodiments of the invention which further include image transmission means such as a digital camera or cell telephone with image acquisition means and image transmission means.

A to certain embodiments of the invention the feeder along with the first sensor, the second sensor, the third sensor (when included in the embodiment of the invention) can be configured as single integrated piece. The term single integrated piece means any embodiment of the feeder invention in which the component parts are directly connected to each other such that all the component parts move as a single construct.

As can be easily understood from the foregoing, the basic concepts of the present invention may be embodied in a variety of ways. The invention involves numerous and varied embodiments of a pet feeding device and methods of use thereof.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "feed" should be understood to encompass disclosure of the act of "feeding"—whether explicitly discussed or not—and, conversely, were there the disclosure of the act of "feeding", such a disclosure should be understood to encompass disclosure of a "feed" and even a "means for feeding". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of pet feeding devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An animal feeder, comprising:
   a. a feeder containing an amount of feed;
   b. a first sensor responsive to at least one altered feed characteristic of said amount of feed in said feeder;
   c. a second sensor responsive to a human locatable a distance from said feeder;
   d. a signal generator responsive to said first sensor and to said second sensor which generates a signal in response to the coincidence of said at least one altered feed characteristic and said human locatable a distance from said feeder; and
   e. an indicia generator which emits a sensorially perceivable indicia in response to said signal from said signal generator.

2. An animal feeder as described in claim 1, wherein said first sensor responsive to said at least one altered feed characteristic is selected from the group consisting of a fluid level sensor, a float level switch, a differential pressure switch, a magnetic float sensor, a membrane switch, a solids level switch, a conductivity liquid level switch, a resistivity liquid level switch, an air bubbler liquid level switch, optical fluid sensor, radiofrequency detector, ultrasonic detector, radar detector, thin film pressure sensor, an infrared emitting diode with NPN silicon phototransistor, a timing circuit, and a timer.

3. An animal feeder as described in claim 2, wherein said feed is selected from the group consisting of: a material consumable by an animal, a solid consumable by an animal, a liquid consumable by an animal, dry animal food, canned animal food, prescription animal diets, diets containing medicaments, medicaments, seeds, meals, pellets, flakes, frozen food, and water.

4. An animal feeder as described in claim 3, wherein said altered feed characteristic is selected from the group consisting of an elapse of a duration of time said feed has been contained in said feeder, an alternation in said amount of feed contained in said feeder, an alternation in a level of said amount of feed contained in said feeder, and an alteration of an amount of weight of said amount of feed contained in said feeder.

5. An animal feeder as described in claim 4, wherein said second sensor responsive to a human locatable a distance from said feeder is selected from the group consisting of an infrared motion sensor, modulated infrared light detector, an ultrasonic motion sensor, an infrared emitting diode with an NPN silicon phototransistor, a load sensor, a pressure switch, radar detector, and a thin film pressure sensor, a global positioning locator element, an Internet domain address locator element, an e-mail address locator element, a wireless transmitter locator element, and a broadband transmission address locator element.

6. An animal feeder as described in claim 5, wherein said indicia generator is selected from the group consisting of an emitter of light, an emitter of sound, an emitter of scent, a light emitting diode, an incandescent light, a light emitting diode which flashes, an incandescent lights which flashes, a piezoelectric sound generator, a mechanical buzzer, a magnetic buzzer, a piezoelectric siren, a piezoelectric indicator, a tone generator, a speaker, a digital message player, a vibrotactile bar, a pulsating transducer, an actuatable aerosol dispensers, a telephone, a facsimile, an e-mail, a wireless transmission, a broadband transmission.

7. An animal feeder as described in claim 6, further comprising a third sensor responsive to an animal proximate to said feeder.

8. An animal feeder as described in claim 7, wherein said third sensor responsive to said animal proximate to said feeder is selected from the group consisting of: an infrared motion sensor, modulated infrared light detector, an ultrasonic motion sensor, an infrared emitting diode with an NPN silicon phototransistor, a load sensor, a pressure switch, radar detector, a thin film pressure sensor, and a transmitter-receiver attached to said animal.

9. A method of feeding an animal, comprising the steps of:
a. containing an amount of feed in a feeder;
b. sensing an alteration in a feed characteristic of said amount of feed contained in said feeder;
c. sensing a human locatable a distance from said feeder;
d. generating a signal in response to said alteration of said feed characteristic of said amount of feed contained in said feeder coincident with said human locatable a distance from said feeder; and
e. emitting a sensorially perceivable indicia in response to said signal generated.

10. A method of feeding an animal as described in claim 9, wherein said step of containing an amount of feed in a feeder comprises the step of containing an amount of feed in said feeder selected from the group consisting of a material consumable by an animal, a solid consumable by an animal, a liquid consumable by an animal, dry animal food, canned animal food, prescription animal diets, diets containing medicaments, medicaments, seeds, meals, pellets, flakes, frozen food, and water.

11. A method of feeding an animal as described in claim 10, wherein said step of sensing an alteration in feed characteristics of said amount of feed contained in said feeder comprises the step of sensing alteration in feed characteristics selected from the group consisting of an elapse of a duration of time said feed has been contained in said feeder, an alternation in said amount of feed contained in said feeder, an alternation in a level of said amount of feed contained in said feeder, and an alteration of an amount of weight of said amount of feed contained in said feeder.

12. A method of feeding an animal as described in claim 11, wherein said step of sensing a human locatable a distance from said feeder comprises the step of sensing said human located within a range of distance of said feeder selected from the group consisting of: between about zero feet and about ten feet, between about 1 foot and about two feet, between about two feet and about three feet, between about three feet and about four feet, between about four feet and about five feet, between about five feet and about six feet, between about six feet and seven feet, between about seven feet and eight feet, between about eight feet and about nine feet, between about nine feet and about ten feet, and between about zero feet and about twenty feet, locatable by global position system tracking, locatable as an Internet domain address, locatable as an e-mail address, locatable as a wireless transmitter address, locatable as a broadband transmission address.

13. A method of feeding an animal as described in claim 12, wherein said step of generating a signal in response to said alteration of said feed characteristic of said amount of feed contained in said feeder coincident with said human locatable a distance from said feeder comprises a signal selected from the group consisting of generating an amount of current in a circuit, an analog signal, and a digital signal.

14. A method of feeding an animal as described in claim 13, wherein said step of emitting a sensorially perceivable indicia in response to said signal generated comprises the step of emitting a sensorially perceivable indicia selected from the group consisting of a light emission, a sound emission, a scent emission, an emission from a light emitting diode, an emission from an incandescent light, a flashing light emission, a flashing incandescent light emission, a sound emission from a piezoelectric sound generator, a sound emission from a mechanical buzzer, a sound emission from a magnetic buzzer, a sound emission from a piezoelectric siren, a sound emission from a piezoelectric indicator, an emission from a tone generator, a sound emission from a speaker, a digital message, a vibration, a pulsation from a transducer, an aerosol spray, a telephone transmission, a facsimile transmission, an e-mail transmission, a wireless transmission, a broadband transmission.

15. A method of feeding an animal as described in claim 14, further comprising the step of step of sensing an animal proximate to said feeder and wherein said step of generating a signal in response to said alteration of said feed characteristic of said amount of feed contained in said feeder coincident with said human locatable a distance from said feeder comprises the step of generating a signal in response to said alteration of said feed characteristic of said amount of feed contained in said feeder coincident with said human locatable a distance from said feeder and said animal proximate to said feeder.

16. A method of producing an animal feeder, comprising the steps of:
a. providing an animal feeder;
b. locating a first sensor to respond to alteration of at least one feed characteristic of an amount of feed contained by said feeder;
c. locating a second sensor to respond to a human locatable a distance from said feeder;
d. coupling a signal generator to said first sensor and said second sensor, wherein said signal generator generates a signal in response to alteration of said at least one feed characteristic coincident with said human locatable a distance from said feeder; and
e. coupling an indicia generator to said signal generator.

17. A method of producing an animal feeder as described in claim 16, wherein said step of locating a first sensor to respond to alteration of at least one feed characteristic of an amount of feed contained by said feeder comprises configuring said first sensor and said feeder as a single integrated piece.

18. A method of producing an animal feeder as described in claim 17, wherein said step of locating a second sensor to respond to a human locatable a distance from said feeder comprises configuring said second sensor and said feeder as a single integrated piece.

19. A method of producing an animal feeder as described in claim 18, further comprising the step of locating third sensor to respond to an animal proximate to said feeder.

20. A method of producing an animal feeder as described in claim 19, wherein said step of locating third sensor to respond to an animal proximate to said feeder comprises the step of configuring said third sensor and said feeder as a single integrated piece.

21. A method of producing an animal feeder as described in claim 20, where said step of coupling an indicia generator to said signal generator comprises the step of configuring said indicia generator and said feeder as a single integrated piece.

* * * * *